United States Patent [19]

Hastings

[11] Patent Number: 4,615,397
[45] Date of Patent: Oct. 7, 1986

[54] AGRICULTURAL IMPLEMENT WITH DOUBLE WING FOLDING MECHANISM USING TOGGLE LINKAGE AND HYDRAULIC ACTUATOR

[75] Inventor: Dawson W. Hastings, Selma, Ala.

[73] Assignee: Deutz-Allis Corporation, Milwaukee, Wis.

[21] Appl. No.: 793,087

[22] Filed: Oct. 30, 1985

[51] Int. Cl.[4] .............................................. A01B 73/04
[52] U.S. Cl. .................................... 172/776; 172/311; 172/501
[58] Field of Search .............. 172/311, 446, 456, 466, 172/501, 662, 776; 280/411 R, 411 A, 411 B, 411 C, 412, 413, 656

[56] References Cited

U.S. PATENT DOCUMENTS

| | | | |
|---|---|---|---|
| 3,180,429 | 4/1965 | Perhink | 172/456 |
| 3,321,028 | 5/1967 | Groenke | 172/311 |
| 4,133,391 | 1/1979 | Richardson et al. | 172/311 |
| 4,178,009 | 12/1979 | Worick | 280/411 A |
| 4,178,998 | 12/1979 | Rockwell | 172/311 |
| 4,232,747 | 11/1980 | Pfenninger et al. | 172/311 |
| 4,512,416 | 4/1985 | Smith | 172/776 |

FOREIGN PATENT DOCUMENTS 491335  2/1976  U.S.S.R. ............................. 172/311

*Primary Examiner*—Richard T. Stouffer
*Attorney, Agent, or Firm*—Charles L. Schwab

[57] ABSTRACT

A five section implement uses a pair of folding mechanisms to fold primary and secondary wing sections above a central main section. The folding mechanisms are disposed mainly on the top side of the primary wing sections thereby providing adequate space on the top of the main section for mounting containers for dispensing liquid agricultural chemicals. Each folding mechanism includes a lost motion connection permitting floating of the implement sections, automatic lock-out structure for the lost motion connection which operates during fold-up of the implement and an automatic gravity operated latch which insures a proper sequence of unfolding of the wing sections. Each folding mechanism is operated by a single hydraulic actuator and a transport locking bar disposed alongside each actuator is provided with a slide pad to prevent damage to the actuator and other parts during operation of the associated folding mechanism.

9 Claims, 6 Drawing Figures

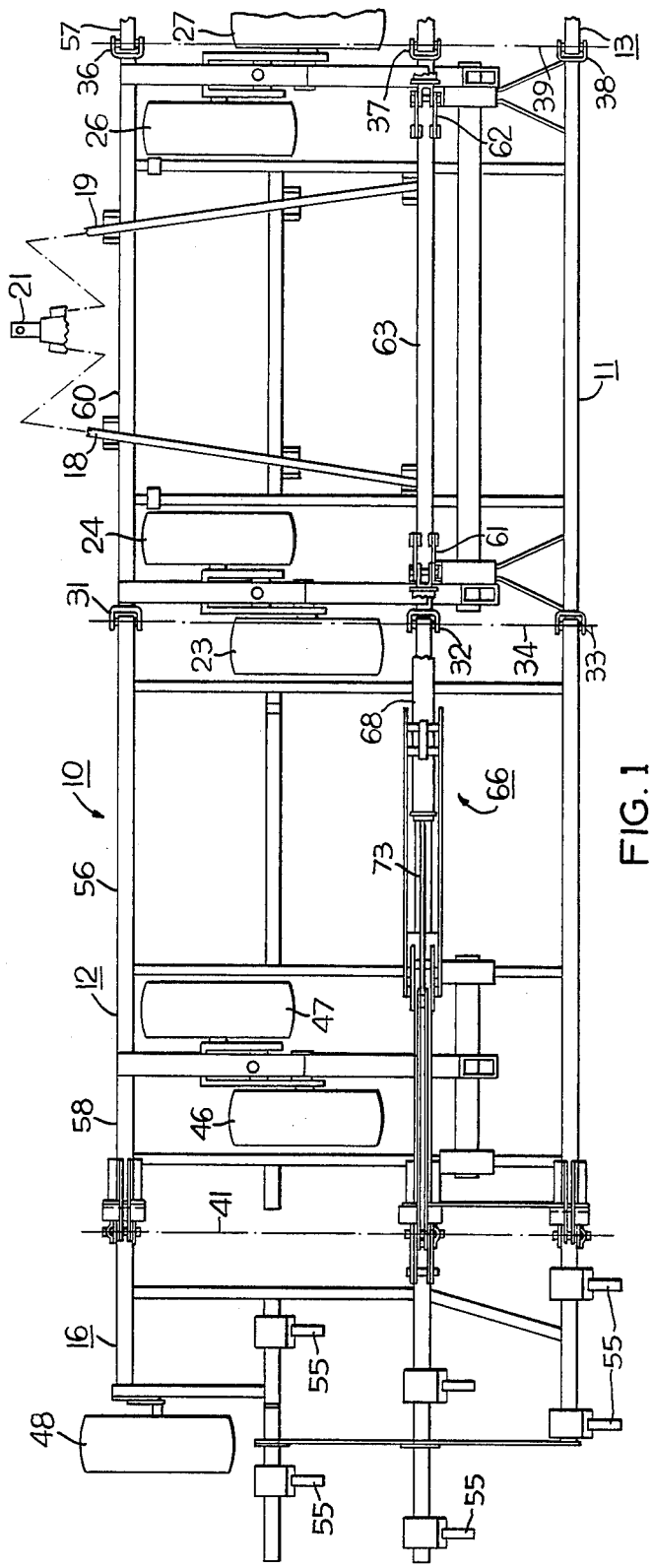
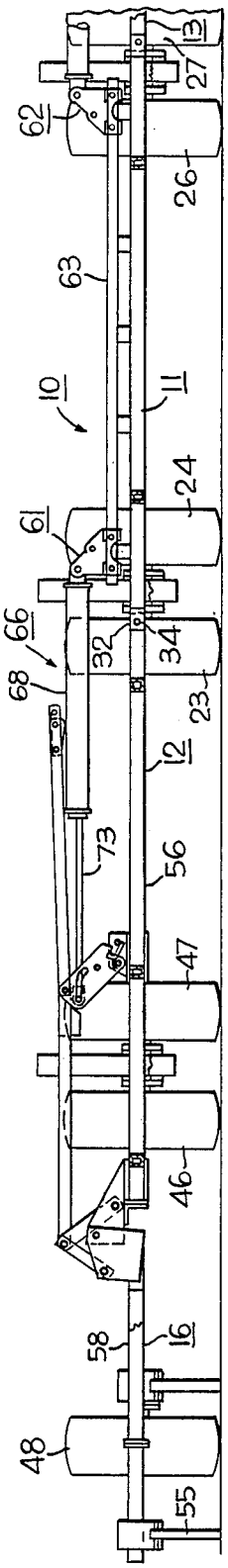
FIG. 1
FIG. 2

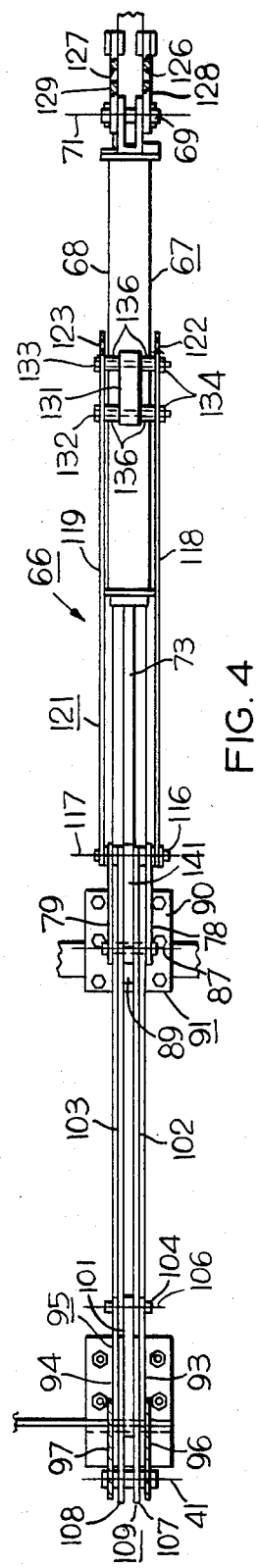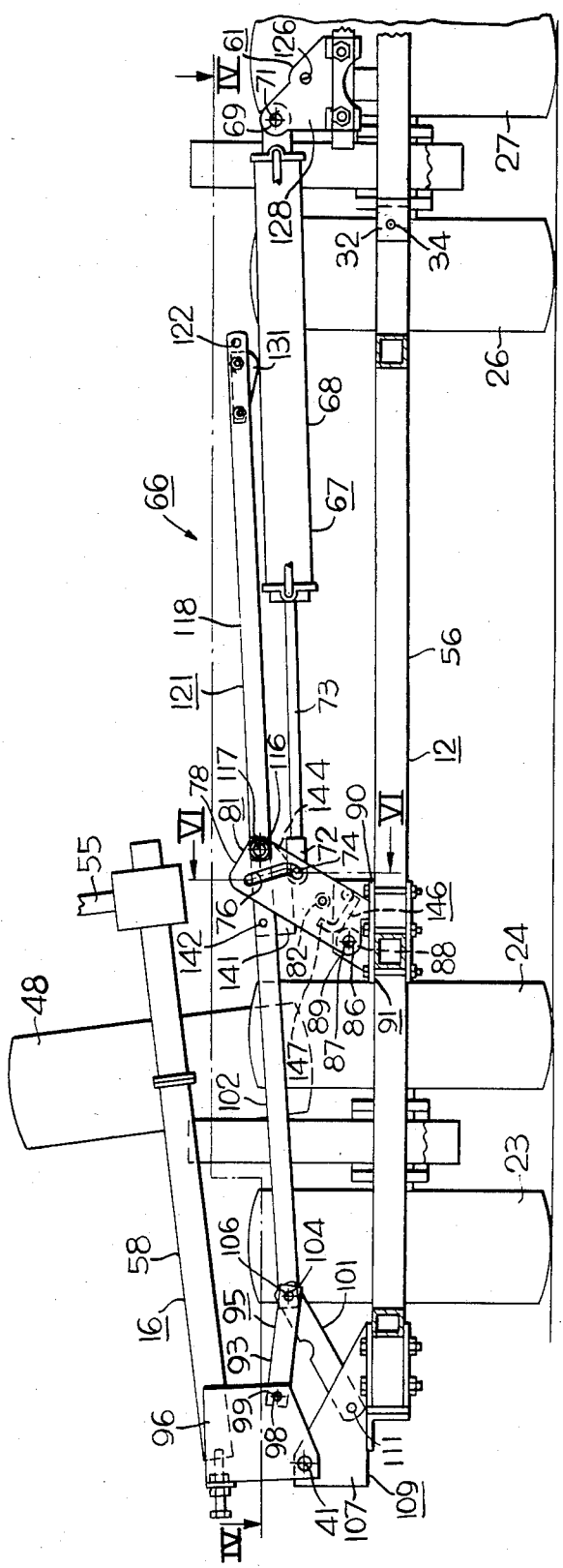

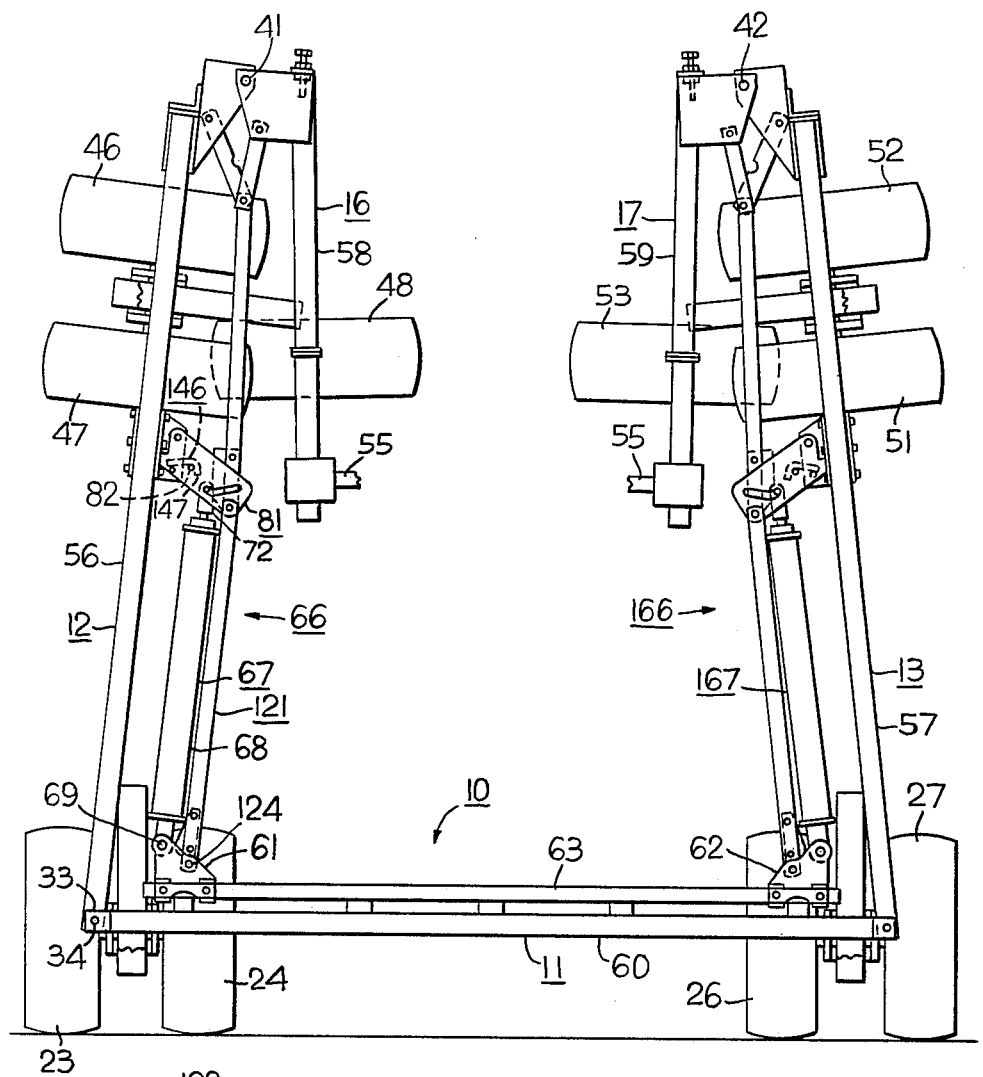
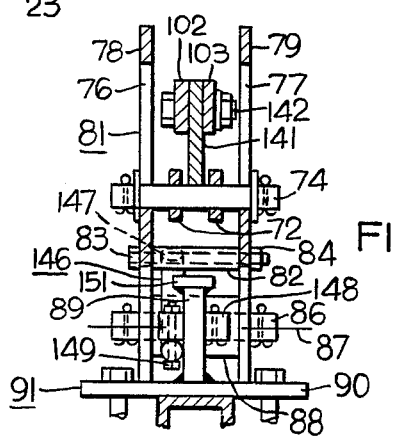
FIG. 5
FIG. 6

AGRICULTURAL IMPLEMENT WITH DOUBLE WING FOLDING MECHANISM USING TOGGLE LINKAGE AND HYDRAULIC ACTUATOR

This invention relates to a folding mechanism for a fold-up agricultural implement in which a single actuator is used to effect the folding of a primary wing section and a secondary wing section.

OBJECTS AND SUMMARY OF THE INVENTION

It is the object of the present invention to provide an improved folding mechanism for primary and secondary wing sections of an implement which uses a single hydraulic actuator.

It is a further object of the present invention to provide a folding mechanism of the type hereinbefore described having operating linkage connected between the hydraulic actuator and the primary and secondary wing sections at one side of the implement which incorporates a lost motion connection permitting floating the associated primary and secondary wing sections in their working positions and wherein lost motion is automatically eliminated when the associated secondary wing section is folded.

It is a further object of this invention to provide a sequencing mechanism which automatically insures a proper sequence of unfolding of the primary and secondary wing sections.

It is a further object of this invention to provide a transport locking bar for a folding implement section which includes a skid pad preventing damage to adjacent components when the locking bar is not in its locking position.

The folding mechanism of this invention is useful in an implement having a main section adapted for connection in draft relation to a towing tractor and primary and secondary fold-up sections extending from at least one lateral side of the main section. The folding mechanism is operative to fold the secondary wing section to an inverted position above the primary wing section and to pivot the primary wing section to an upright position relative to the main section using a single actuator. The operating linkage of the folding mechanism preferably includes a lost motion connection allowing a floating condition of the wing sections relative to the main section when the wing sections are unfolded to their horizontal earth working positions. Means may be provided to lock out the floating function when the secondary wing section is folded to its inverted transport position on the primary wing section, thus avoiding possible uncontrolled free-fall movement of the folded wing section assembly as it passes through an overhead dead center or balanced position. Also, a sequencing mechanism may be provided to prevent unfolding of the secondary wing section relative to the primary wing section during movement of the latter from its upright transport position to a laterally outwardly extending position.

BRIEF DESCRIPTION OF THE DRAWINGS

One embodiment of the invention is shown in the drawings in which:

FIG. 1 is a partial top view of an agricultural implement;

FIG. 2 is a rear view of the structure shown in FIG. 1 with parts broken away for illustration purposes;

FIG. 3 is an enlarged rear view of one lateral side of the implement with the outer or secondary wing section folded to a transport position and with parts broken away for illustration purposes;

FIG. 4 is a view taken along the line IV—IV in FIG. 3;

FIG. 5 is a rear view of the implement folded to a transport position; and

FIG. 6 is a view taken along the line VI—VI in FIG. 3.

DETAILED DESCRIPTION OF THE DRAWINGS

Referring to FIGS. 1, 2 and 5, a fold-up agricultural implement in the form of a field cultivator 10 includes a main frame section 11, a pair of primary wing sections 12, 13 and a pair of secondary or extension wing sections 16, 17. The main frame section 11 includes draft members 18, 19 which converge in a forward direction to a hitch component 21 adapted for connection to a towing tractor, now shown. The main frame section 11 is supported by tandem wheels 23, 24 and tandem wheels 26, 27 which are vertically adjustable relative to the main frame section 11 by means not shown. The primary wing section 12 is pivotally connected at one of its lateral sides to one lateral side of the main frame section 11 by pivot connections 31, 32, 33 which have pivot pins aligned on a horizontal and longitudinally extending axis 34. The other lateral side of the main frame section 11 is pivotally connected to one lateral side of the primary wing section 13 by pivot connections 36, 37, 38 having pivot pins aligned on longitudinal horizontal axis 39. In a similar manner, the laterally inner or inboard sides or ends of the secondary wing sections 16, 17 are pivotally connected to the laterally outer or outboard sides or ends of the primary wing sections 12, 13, respectively, on parallel longitudinal horizontal axes 41, 42. A pair of vertically adjustable tandem support wheels 46, 47 support the primary wing sections 12 and a single vertically adjustable wheel 48 supports the secondary wing section 16. In a similar manner, vertically adjustable tandem wheels 51, 52 support the primary wing section 13 and a single vertically adjustable wheel 53 supports the secondary wing section 17. The wing sections 12, 13, 16, 17 have frames 56, 57, 58, 59, respectively, to which spring tine tillage tools 61 are attached. Only a few of the tools 55 are illustrated in the drawings and it should be understood that tools are appropriately spaced and secured to the transverse members of the frames 56, 57, 58, 59 and to the frame 60 of the main section 11 to properly cultivate a field. The main section frame 60 also includes a pair of cylinder supporting brackets 61, 62 interconnected by a transverse brace 63. In the working position of the implement, the frames 56-60 are aligned in a generally horizontal plane. However, as hereinafter explained, the wheel supported frames are permitted to float relative to one another so as to follow the contour of the field during a cultivating operation.

Referring also to FIGS. 3 and 4, the secondary wing section 16 has been folded from its working or cultivating position, shown in FIGS. 1 and 2, to its inverted transport position by partial contraction of a double acting hydraulic actuator 67 of a folding mechanism 66. Further contraction of the actuator 67 pivots the primary wing section to its upright transport position as shown in FIG. 5. In a similar manner, the wing sections 13, 17 are folded by a folding mechanism 166 which includes a double acting extendable and contractable hydraulic actuator 167. The folding mechanism 166 is a reverse image of the folding mechanism 66. The linear actuator 67 includes a cylinder component or cylinder 68 having a closed end pivotally connected to the bracket 61 on the main section frame 11 near one of its lateral ends or sides by a pivot pin 69 whose longitudinal horizontal axis 71 is parallel to the folding axis 34 and is spaced above and inboard of the folding axis 34. A clevis 72 on the outer end of a piston component or rod 73 carries a longitudinally extending pin 74 which is transverse to the rod 73 and has oppositely extending cylindrical portions slidingly engaging slots 76, 77 in upstanding parallel plates 78, 79 of a motion transmitting or multiplying lever 81. The pin 74 and slots 76, 77 form a lost motion connection permitting floating of the wing sections 12, 16 during a cultivating operation. The plates 78, 79 are secured in spaced parallel relation to one another by a cylindrical tube spacer 82 and releasable fastening means in the form of bolt 83, extending through the hollow spacer 82 and through aligned openings in the plates, and a nut 84 on the threaded end of the bolt 83. The lower ends of the plates 78, 79 of the lever 81 are pivotally connected to the frame 56 of the primary wing section 12 by a pivot pin 86 for pivotal movement about a longitudinal horizontal axis 87 between its wing folding position shown in FIGS. 3–6 and its wing unfolding position shown in FIGS. 1 and 2. The pivot pin 86 extends through a hollow cylindrical portion 88 of an upstanding flange 89 on a support or mounting bracket 91. Abutment surfaces on the lower ends of the plates 78, 79 abut the upward facing surface of a horizontal flange 90 of the bracket 91 when the lever 81 is in its wing folding position.

The folding linkage 66 includes a toggle joint 95 having a pair of side-by-side parallel links 93, 94 and a link 101. The links 93, 94 have first corresponding ends pivotally connected to parallel upstanding brackets 96, 97 by a longitudinally and horizontally disposed pivot pin 98 whose axis 99 is parallel to the pivot axis 41 and the link 101 has one end pivotally connected to the second corresponding ends of links 93, 94 and to corresponding outboard ends of a motion transmitting connector in the form of parallel links 102, 103 by a longitudinally and horizontally disposed pivot pin 104 whose axis 106 is parallel to the pivot axis 41. The other end of the link 101, opposite the end connected to pivot pin 104, is pivotally connected to a pair of parallel upstanding flanges 107, 108 of a bracket 109 secured to the primary section frame 12 by a longitudinally and horizontally disposed pivot pin 111 which is parallel to the pivot axis 41. The corresponding inboard ends of the links 102, 103 are pivotally connected to the upper ends of plates 78, 79 of the motion multiplying lever 81 by a longitudinally and horizontally disposed pivot pin 116 whose pivot axis 117 is parallel to the pivot axis 87. The outboard ends of parallel straps 118, 119 of a locking bar 121 are also pivotally connected to the upper end of the plates 78, 79 of the motion multiplying lever 81 by the pivot pin 116. The inboard ends of the straps have aligned openings 122, 123 for receiving, as shown in FIG. 5, a locking pin 124 which also extends through aligned openings 126, 127 in upstanding plates 128, 129 of the bracket 61. Thus, when the locking bar 121 is secured to the bracket 61, it serves to maintain or lock the fold-up mechanism 66 and the wing sections 12, 16 in their fold-up positions, as shown in FIG. 5. When the locking bar 121 is locked in place by the pin 124, the retracted hydraulic actuator 67 may be relieved of pressure. By locking the fold-up mechanism 66, the locking bar 121 also prevents unfolding of the secondary wing section 16 relative to the primary wing section 12. A slide pad 131 is secured to the inboard ends of straps 118, 119 of the transport locking bar 121 by a pair of bolts 132, 133 and nuts 134. The bolts 132, 133 extend through hollow cylindrical spacers 136 and a pair of openings in the pad 131. The bottom of the pad is rounded or tapered downwardly from its opposite inboard and outboard ends so as to slide easily over the outer surface of the cylinder 68 during folding and unfolding of the implement without damage to the cylinder 68, the locking bar 121 or the bracket 61.

In the unfolded or operating position of the cultivator wing sections 12, 16, the lost motion connection effected between the motion multiplying lever 81 and the hydraulic actuator 67 by the pin 74 and slots 76, 77 allows the wing sections 12, 16 to float. In other words, the sections 11, 12, 16 are free to pivot relative to one another about the longitudinal horizontal axes 34, 41 and follow the contour of the field being cultivated by the implement. However, when the actuator 67 is partially retracted to fold up the secondary wing 16 to its inverted transport position, as shown in FIG. 3, a lost motion lockout member in the form of cam block 141 forces the pin 74 to a pivot position in the bottoms of the slots 76, 77 thereby preventing lost motion movement during folding of the primary section 12 relative to the main section 11. The cam block 141 has an opening at its inboard end through which the pin 116 extends and its outboard end is secured to the links 102, 103 by a pin 142. The inboard end of the block 141 has a tapered surface 144 which serves to cam the pin 72 toward the bottoms of the slots 76, 77 during a fold-up operation of the folding mechanism 66. Thus, the cam block 141 serves as an automatic lost motion lockout member.

When it is desired to unfold the implement, the locking pin 124 is removed and the actuator 67 is extended. A latch 146 pivotally connected to the frame 56 has a hook portion 147 in latched engagement with the spacer 82 on the lever 81 thereby preventing unfolding of the secondary wing section 16 relative to the primary wing section 12. Thus, during initial extension of the actuator 67, the primary wing section 12 is pivoted from its upright transport position shown in FIG. 5 about axis 34. When the folded assemblage of sections 12 and 16 pivots about axis 34 beyond a balanced overhead position, the actuator 67 will retard its descent to a lowered position. As the section 12 moves toward its horizontal working position, the latch 146 will pivot by gravity to its unlatched position shown in FIG. 3 in which it is disengaged from the spacer 82. When the wheels 23, 24 engage the ground, the primary section 12 is in its horizontal position and further extension of the actuator 67 causes the secondary wing section to pivot from its overlying inverted position to a horizontal working position in outboard relation to the primary section 12, as shown in FIGS. 1 and 2. When the wing sections 12, 16 are folded, section 12 will fold first, then the folded assemblage will be pivoted about axis 34 to an overhead position. As the overhead position is approached, the gravity operated latch 146 will automatically pivot to the latched position shown in FIG. 5. Without the automatic gravity operated latch mechanism, comprised of latch 146 and spacer 82, the secondary wing section 16 would, during initial unfolding, pivot about axis 41 before the primary wing section 12 pivots about axis 34.

This would result in the secondary wing sections 16 and 17 striking one another with destructive results.

As shown in FIGS. 3 and 6, the hook portion 147 of the latch 146 is secured to a pivot pin portion 148 by a bolt 149. The pivot pin portion extends through a cylindrical opening in the upstanding flange 89 of the bracket 91 and is maintained in assembly therewith by a suitable cotter pin. In the unlatched position of the latch 146, as shown in FIG. 3, it rests on or abuts the cylindrical portion 88 on the flange 89 of the bracket 91. A stop or abutment element in the form of a bar 151 is welded to the flange 89 of the bracket 91 and serves to prevent the latch 146 from being improperly pivoted inboard beyond an upright position.

It will be noted that the folding mechanisms 66, 166 are disposed mainly on the primary wing sections and only a modest amount of space is used on the main section 11. This leaves adequate space on the main section for mounting of containers for dispensing liquids during a cultivating operation.

It should be understood that the hydraulic actuators 67, 167 are connected in parallel in a hydraulic control system, not shown.

The embodiments of the invention in which an exclusive property or privilege is claimed are defined as follows:

1. An agricultural implement comprising:
    a horizontally disposed main section with a draft component at its front end adapted for connection in towed relation to a towing tractor,
    a pair of primary wing sections on laterally opposite sides of said main section and having inboard sides pivotally connected to the laterally opposite sides of said main section for pivotal movement about a pair of first longitudinal horizontal axes for swinging movement from unfolded horizontal working positions to upright transport positions,
    a pair of secondary wing sections disposed outboard of and adjacent to said primary wing sections, respectively, with inboard sides pivotally connected to the outboard sides of said primary wing sections for folding movement about a pair of second longitudinal horizontal axes between unfolded horizontal working positions and inverted folded transport positions on said primary wing sections, respectively, and
    a pair of folding mechanisms for folding said wing sections from working positions to transport positions, each of said folding mechanisms including
    a toggle linkage having
        a first toggle link having one end pivotally connected to one secondary wing section outboard of the axis on which the latter is connected to an adjacent one of said primary wing sections,
        a second toggle link having one end pivotally connected to said one primary section inboard of said axis on which the latter is connected to said one secondary wing section, and
        means pivotally connecting the other ends of said toggle links to one another,
    a lever having one end pivotally connected to said one primary wing section intermediate the laterally opposite sides of the latter,
    a transversely extending motion transmitting link having one end pivotally connected to said lever and its other end pivotally connected to said toggle linkage,
    an extendable and contractable double acting hydraulic actuator having cylinder and piston components,
    means pivotally connecting one of said components to said main section near the side thereof pivotally connected to said one primary wing section, and
    a lost motion connection between said other component of said actuator and said lever affording a floating condition of said one secondary section and one primary section when the latter are in their working positions.

2. The implement of claim 1 wherein said lost motion connection is intermediate the connection of said motion transmitting link to said lever and the pivot connection of said lever to said one primary wing section.

3. The implement of claim 2 wherein said lost motion connection includes a slot and a pin.

4. The implement of claim 3 wherein said slot is in said lever and said pin is on said piston component.

5. The implement of claim 1 wherein said lever and said one primary section have cooperating abutment surfaces which abut when said actuator is partially contracted to fold said one secondary section to its transport position.

6. The implement of claim 1 and further comprising a lost motion lock-out means automatically preventing lost motion movement of said lost motion connection when said one secondary section is folded to its transport position.

7. The implement of claim 1 wherein said lever is pivotable about its connection with said primary wing section between a first position in which said one secondary section is in its unfolded horizontal working position and a second position in which said one secondary wing section is in its folded transport position and further comprising a gravity operated latch pivotally mounted on said one primary wing section and a latch element on said lever, said latch pivoting automatically to engage said latch element when said lever is in said second position and said one primary wing section is in its transport position whereby during initial unfolding movement of said one primary wing section said latch prevents pivoting of said lever relative to said one primary wing section, said latch pivoting automatically to disengage from said latch element when said one primary wing section is pivoted through a predetermined angle from its upright transport position toward its working position.

8. The implement of claim 1 and further comprising a transport locking bar having one of its opposite ends pivotally connected to said lever and the other of its opposite ends adapted for connection to said main section and means for selectively securing said other end of said locking bar to said main section.

9. The implement of claim 8 wherein said bar is disposed alongside said actuator and includes a slide pad at its other end slidingly engageable with said cylinder component during operation of said folding mechanism.

* * * * *